INVENTOR.
PIERRE MARCEL HONNELL
BY D. A. Fischer
ATTORNEY

INVENTOR
PIERRE MARCEL HONNELL
BY [signature]
ATTORNEY

INVENTOR
PIERRE MARCEL HONNELL
BY [signature]
ATTORNEY

April 23, 1968 P. M. HONNELL 3,379,867

ELECTRONIC NETWORK SYNTHESIS OF MATHEMATICAL MATRIC EQUATIONS

Filed June 11, 1963 5 Sheets-Sheet 4

INVENTOR
PIERRE MARCEL HONNELL
BY D. A. Fischer
ATTORNEY

INVENTOR
PIERRE MARCEL HONNELL
BY Dr. A. Fischer
ATTORNEY 3,379,867

ELECTRONIC NETWORK SYNTHESIS OF MATHEMATICAL MATRIC EQUATIONS

Pierre M. Honnell, 908 Wild Cherry Lane, University City, Mo. 63130

Filed June 11, 1963, Ser. No. 287,014
14 Claims. (Cl. 235—180)

This invention relates to electronic devices for the synthesis of matric calculus equations.

The present invention incorporates improvements over the electric synthesizer disclosed by Honnell and Horn in U.S. Patent 3,038,660, granted June 12, 1962.

This invention provides a practical manner of synthesizing an electronic network which has a condition of electrical equilibrium or state whose mathematical formulation is identical with the matric problem to be solved. The equilibrium magnitudes of the electrical coordinates are then the desired solution to the mathematical problem.

The present invention embodies the features of the prior invention (3,038,660) but as its special objective introduces certain additional improvements which increase the flexibility of the synthesis procedure. Further objects of this invention are simplification of the construction of the entry synthesis subnetworks; improvements of the stability against extraneous oscillations; improvement of the linearity of the complete synthesis network; and increased versatility of the synthesis for very complex non-linear matric mathematical problems involving functionally varying admittance entry subnetworks.

One concept of the present invention is the introduction into the electronic synthesis network of individual isolating amplifiers for each entry synthesis subnetwork. These isolating amplifiers may be called entry amplifiers, and may each be provided with its associated precision gain control. The entry amplifiers are in addition to, and function in conjunction with, the main high-gain admittance-multiplying amplifiers. The main high-gain admittance-multiplying amplifiers are provided on each principal diagonal position of the synthesis network, and may be called trace admittance amplifiers because they appear on the trace of the mathematical matrix being synthesized.

In essence, the synthesis network comprises two independent sets of electrical connector wires arranged in rows and columns respectively. At each cross-over of the connector wires, an entry amplifier and an associated entry subnetwork is located. To one set of the electrical connector wires, the input-rows, a sequence of current-sources are attached. At the principal diagonal positions, or trace of the connector wires, or grid, the trace amplifiers interconnect the input-row connectors to the remaining set, the output-column connectors. The desired solutions of the mathematical matric problem appears on the output-columns. The connector grid and its associated amplifiers and synthesis subnetworks is a physical image or synthesis of the matric mathematics. The electronic synthesis network and the mathematical matric equation are in 1-to-1 reciprocal correspondence, or homeomorphic.

The invention will be more easily understood in connection with the drawings accompanying this specification, in which.

Figure 3:
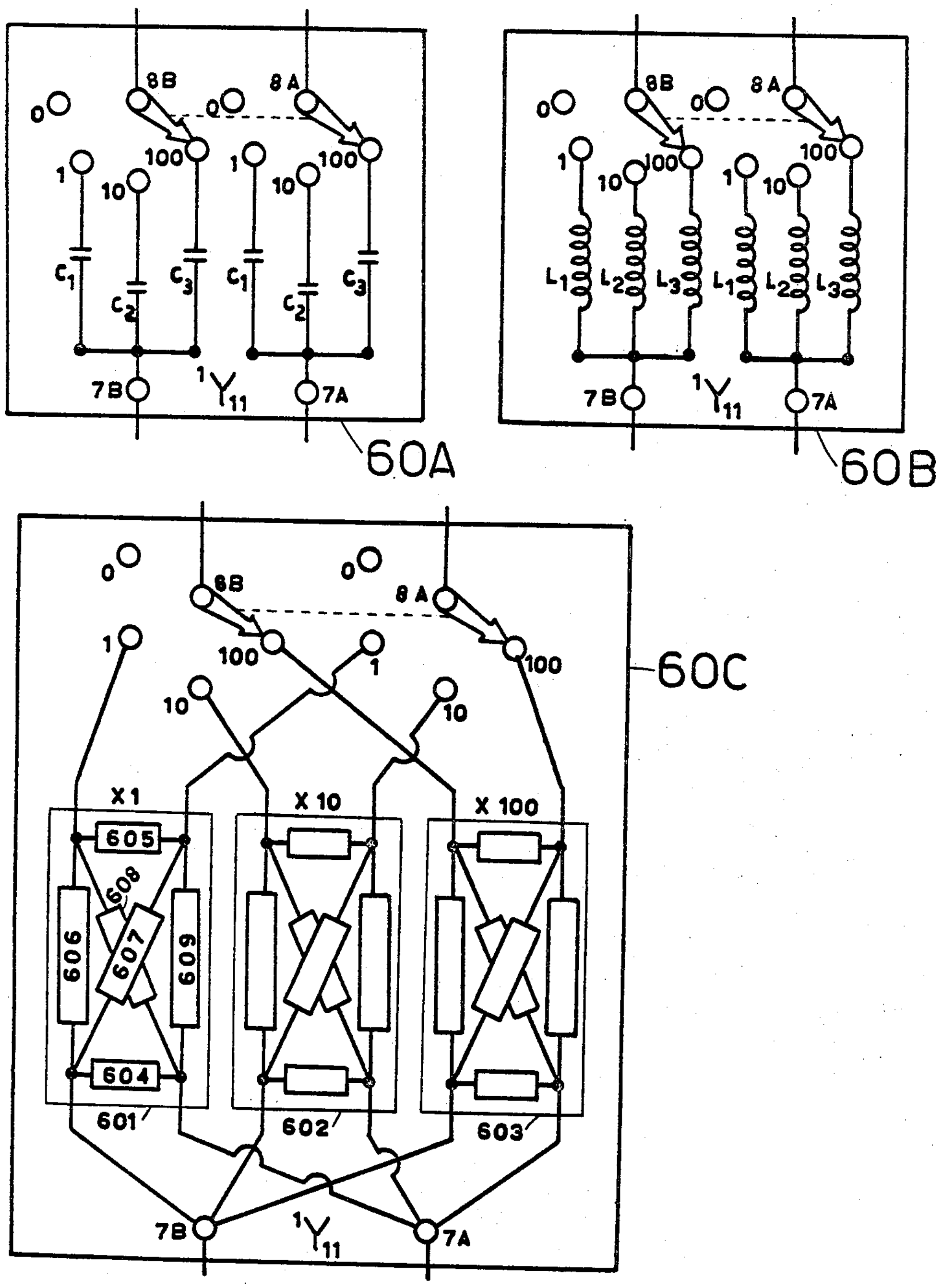

FIG. 3 exhibits in detail the entry synthesis subnetworks.

Figure 4:
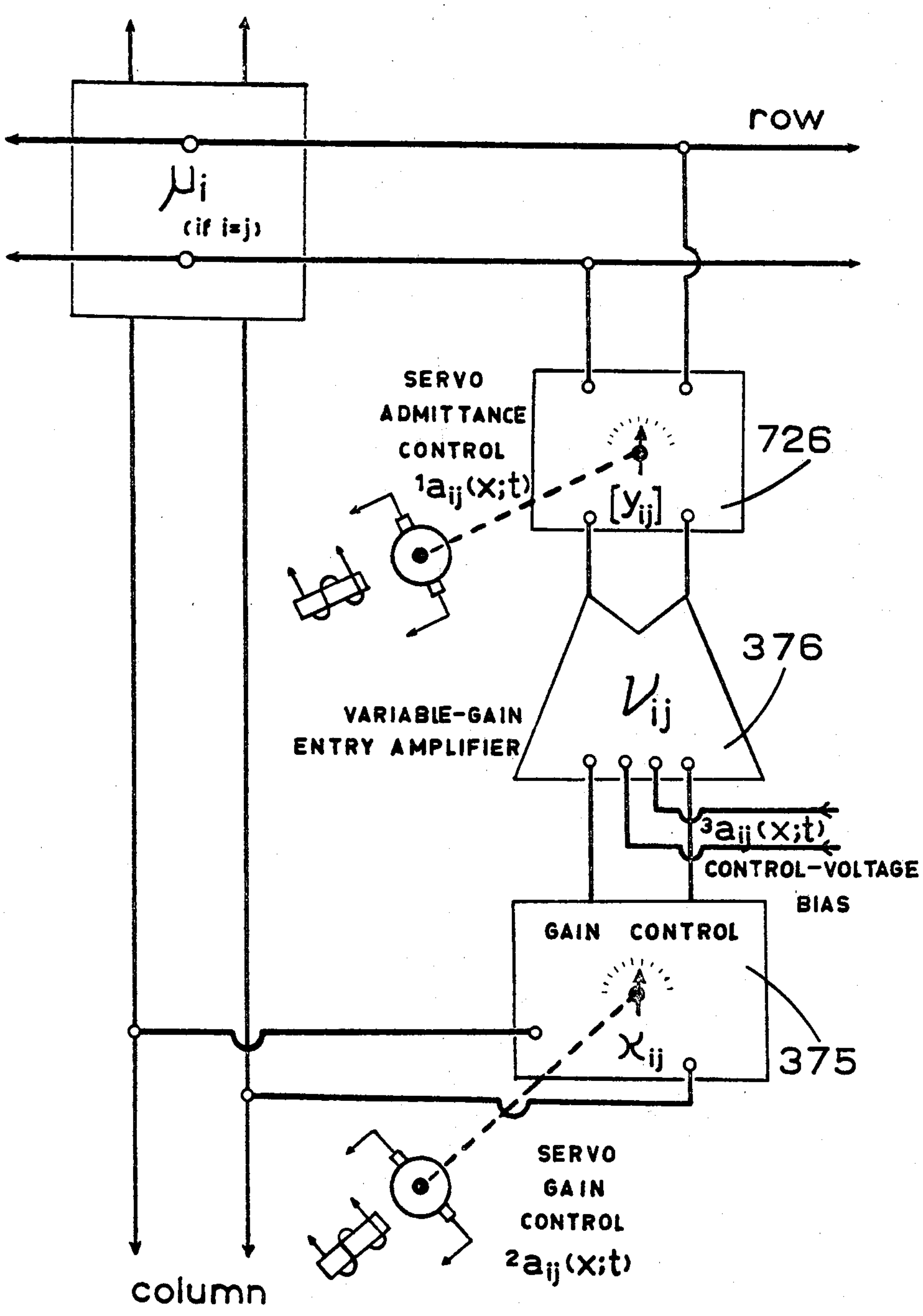

FIG. 4 represents symbolically the functionally variable entry synthesis subnetworks employed to represent variable and non-linear terms in mathematical matrices.

Figure 5:
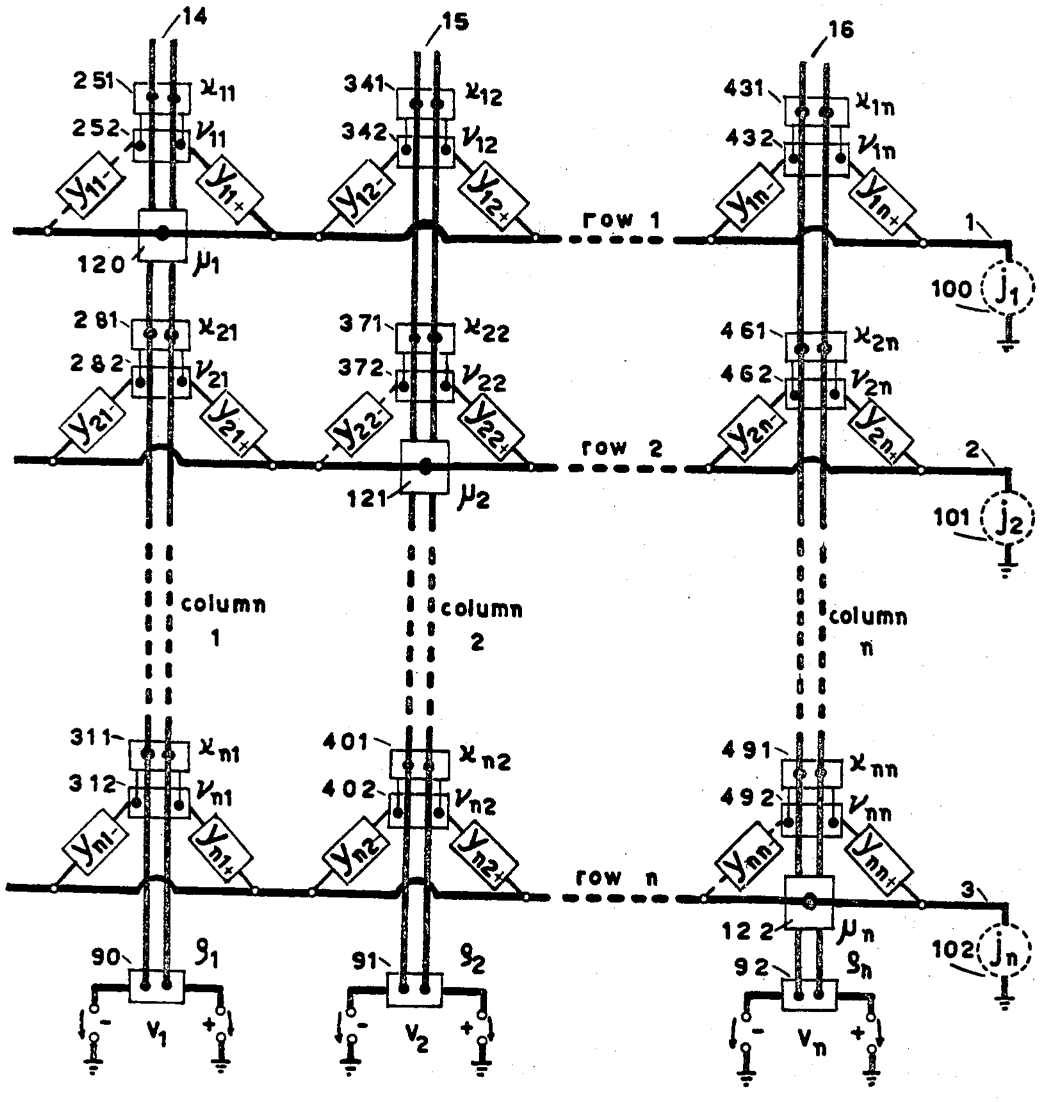

FIG. 5 shows a variation of the electronic synthesis network employing unipolar input and bipolar output trace amplifiers.

An ($n$; $n$)-order matric equation $[A][x]=[b]$, in expanded form, reads $$\begin{bmatrix} a_{11} & a_{12} & \cdots & a_{1n} \\ a_{21} & a_{22} & \cdots & a_{2n} \\ \cdot & \cdot & \cdots & \cdot \\ \cdot & \cdot & \cdots & \cdot \\ \cdot & \cdot & \cdots & \cdot \\ a_{n1} & a_{n2} & \cdots & a_{nn} \end{bmatrix} \cdot \begin{bmatrix} x_1 \\ x_2 \\ \cdot \\ \cdot \\ \cdot \\ x_n \end{bmatrix} = \begin{bmatrix} b_1 \\ b_2 \\ \cdot \\ \cdot \\ \cdot \\ b_n \end{bmatrix} \quad (1)$$

in which the first number of the subscript of the "$a$" locates the row, and the second number of the subscript the column, of each entry. In the simplest situation the entries $a_{ij}$ of the coefficient matrix [A] in Equation 1 are given constants, the $b_i$ entries in the vector $[b]$ are also given constants, and finally the $x_j$ entries in the $[x]=[x_1, x_2, \ldots, x_n]$ vector are the unknowns to be determined. The entries $a_{ij}$ may however also contain differential and integral coefficients and functions or their combinations. The prescribed coefficients $b_i$ may be time functions. In these more complicated situations, the components of the solution vector $[x]$ are no longer constants, but functions. In even more general situations, all these coefficients are to be interpreted in a matric sense: i.e., each $a_{ij}$, $b_{ij}$ and $x_i$ is itself a matrix, yielding a matrix of matrices, or a compound matric equation.

Figure 1:
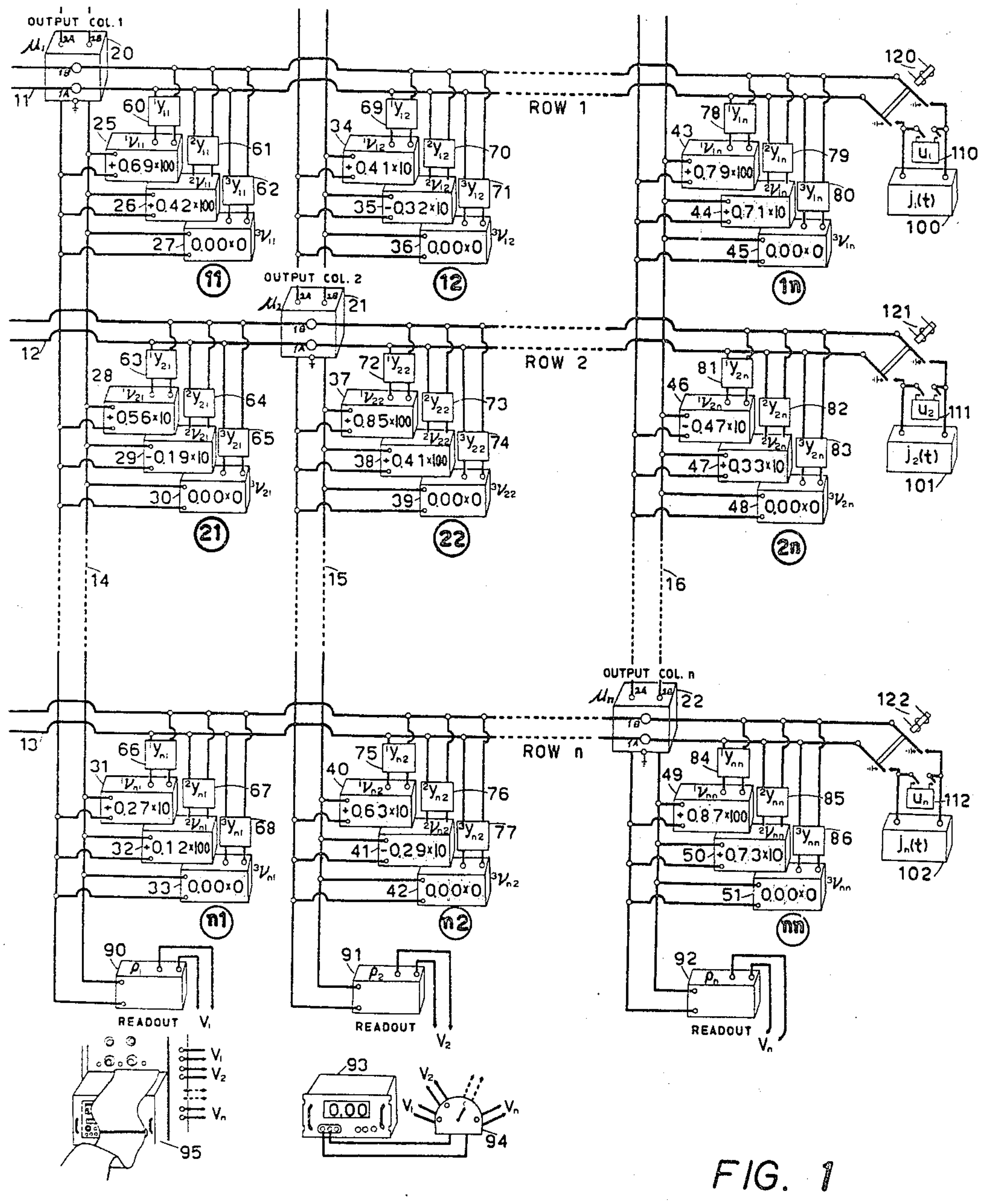
FIG. 1 illustrates symbolically one basic version of the electronic synthesis network homeomorphic to a mathematical matric equation of ($n$; $n$)-order with three distinct terms per matric entry.

Now it can be shown that the electronic synthesis network in FIG. 1 has an equation of state given by $[Y][v]=[j]$; where [Y] represents the synthesis network, $[j]$ the prescribed current-source vector, and $[v]$ is the response voltage vector. Expanded, this is $$\begin{bmatrix} \kappa_{11}\cdot y_{11} & \kappa_{12}\cdot y_{12} & \cdots & \kappa_{1n}\cdot y_{1n} \\ \kappa_{21}\cdot y_{21} & \kappa_{22}\cdot y_{22} & \cdots & \kappa_{2n}\cdot y_{2n} \\ \cdot & \cdot & \cdots & \cdot \\ \cdot & \cdot & \cdots & \cdot \\ \cdot & \cdot & \cdots & \cdot \\ \kappa_{n1}\cdot y_{n1} & \kappa_{n2}\cdot y_{n2} & \cdots & \kappa_{nn}\cdot y_{nn} \end{bmatrix} \begin{bmatrix} v_1 \\ v_2 \\ \cdot \\ \cdot \\ \cdot \\ v_n \end{bmatrix} = \begin{bmatrix} j_1 \\ j_2 \\ \cdot \\ \cdot \\ \cdot \\ j_n \end{bmatrix} \quad (2)$$

in which each $\kappa_{ij}$ is the scalar multiplying factor of the corresponding gain control; and each $y_{ij}$ term is either a constant, differential, or integral term, or combinations thereof. These may be synthesized by a conductance, capacitance, inductance, or their combinations respectively.

Thus an exact homeomorphism or correspondence exists between the purely mathematical Equation 1 and the physical network of FIG. 1 represented by Equation 2, or $$[A][x]=[b] \Longleftrightarrow [Y][v]=[j] \quad (3)$$

It follows that the desired solution $[x]$ to the mathematical matric Equation 1—whether algebraic, differential or integral—is given by the automatically generated solution vector $[v]$ of the electronic synthesis network, which is represented mathematically by Equation 2 and physically as shown in FIG. 1.

Without loss of generality, and as a consequence of the flexibility of matric notation, the following assumes that the coefficient matrix [A] is square, or of $(n; n)$-order. Problems of $(m; n)$-order wherein $m \neq n$ are solved by an electronic synthesis network of order $(n; n)$ or $(m; m)$, whichever is larger.

The electronic synthesis network shown in FIG. 1 is homeomorphic to an $(n; n)$-order mathematical matric equation. It comprises $n$ high-gain, low-pass admittance amplifiers $\mu_1, \mu_2, \ldots, \mu_n$, with substantially zero input admittance, represented by the square symbols 20, 21, . . ., 22. In this most general situation, the trace amplifiers are of the balanced-to-ground type with a pair of input terminals or nodes 1A, 1B and a pair of output nodes 2A, 2B as shown in FIG. 1. These are respectively connected to a set of input-row and a set of output-column pairs of connectors forming a grid. The input-row pairs 11, 12, . . ., 13 are respectively connected to the inputs of the trace amplifiers, 20, 21, . . ., 22. The output-columns 14, 15, . . ., 16 are respectively connected to the outputs of the trace amplifiers 20, 21, . . ., 22. This forms the fundamental matric connector network.

The entry synthesis subnetworks numbered 60 to 86 are situated at the crossover points between the input-row connectors 11, 12, . . ., 13 and output-column connectors 14, 15, . . ., 16. There is a total of $\rho \cdot n^2$ such entry synthesis subnetworks, for an $(n; n)$-order mathematical matrix. First of all $n^2$ since the mathematical matrix is of $(n; n)$-order. The complexity of each entry determines $\rho$. If the matric entry $a_{ij}$ is a constant, then $\rho=1$. If the entry is a constant plus a differential coefficient, $\rho=2$. If the entry is more complicated $\rho$ will likewise increase. Thus if the entry were a constant, a differential and an integral coefficient, $\rho$ would be 3. Each of the $\rho \cdot n^2$ entry synthesis subnetworks interconnects the respective output-column conectors to the input-row connectors; but this interconnection is made through the means of a substantially unilateral entry amplifier $\nu_{ij}$ and gain control $\kappa_{ij}$ in cascade.

More explicitly, as shown in FIG. 1, the output of of the entry synthesis subnetworks 60, 61, and 62 on row 1 is connected to the input of trace amplifier 20 by means of the input-row connector pair 11. The outputs of the entry synthesis subnetworks 69, 70 and 71 on row 1 are likewise connected to the input-row connector pair 11. In a like manner, the outputs of row 2 entry synthesis subnetworks 63, 64, 65 and so on, including 81, 82 and 83, are connected to the input-row connector pair 12 on which appears the input to trace amplifier 21. Similar interconnections are made on the remaining rows, including 13.

Again referring to FIG. 1, the inputs of the entry synthesis subnetworks on any one column such as 60, 61, and 62; or 63, 64, and 65; and so forth to 66, 67, and 68 all appearing on column 1, are connected to the output-column connector pair 14. Each subnetwork input is, however, respectively in cascade with its own isolating entry amplifier $\nu_{ij}$ and gain control $\kappa_{ij}$. Taking the ⑪ matric entry as typical, the combined gain control and entry amplifier indicated as 25 in FIG. 1 is shown in detail in FIG. 2 as the gain control 251 and isolating entry amplifier 252. The input nodes 3A, 3B of the balanced precision gain control 251 connect to column 1 connector pair 14. The output nodes 4A, 4B of the gain control 251 connect directly to the input nodes 5A, 5B of the balanced entry amplifier 252. The output nodes 6A, 6B of the entry amplifier 252 in turn connect to the nodes 7A, 7B of the entry synthesis subnetwork 60 explicity shown in a simple form in FIG. 2. Finally, the output nodes 8A, 8B of the synthesis subnetwork 60 connect to the input-row connectors 11 leading to the input nodes 1B and 1A of the trace amplifier 20. This completes the interconnections of 60, the first of the $\rho$ synthesis subnetworks on entry position ⑪ of the electronic synthesizer. The remaining $(\rho-1)$ synthesis subnetworks 61, 62 on position ⑪ of the connector wires or grid are similarly connected between output-column 14 and input-row 11.

The synthesis subnetworks 63 to 86 with their associated gain controls and entry amplifiers 28 to 51 on the remaining entry positions shown in FIG. 1 are similarly interconnected, thereby completing that portion of the electronic synthesis network homeomorphic to the matrix [A] of Equation 1.

The complete synthesis network FIG. 1 is energized by current-sources 100, 101, . . ., 102, the components of the prescribed current vector $[j]$ of Equation 2, corresponding to the prescribed known mathematical vector $[b]$, Equation 1. The current sources are connected respectively on the input-row connectors 11, 12, . . ., 13. For differential equation systems, initial conditions are also included on the rows by the voltage-sources 110, 111, . . ., 112 and switched as shown in FIG. 1.

The desired response voltage vector $[v]$, Equation 2, whose components are $v_1, v_2, \ldots, v_n$ and which corresponds to the mathematical solution vector $[x]$ of Equation 1 whose components are $x_1, x_2, \ldots, x_n$ appears on the output-columns. These response voltages may be read out on a digital voltmeter 93 through readout amplifiers 90, 91, and 92. Thus $v_1$ or $x_1$ appears on column 14, at the output of readout amplifier 90; $v_2$ or $x_2$ on readout amplifier 91; and so on to $v_n$ of $x_n$ on readout amplifier 92.

In applications of the electronic synthesizer to the simulation or solution of a single or fixed matric problem, the gain controls $\kappa_{ij}$ and synthesis networks $y_{ij}$ of course would be of substantially fixed or predetermined settings and magnitudes, whereas in a computor these would naturally be adjustable controls.

Figure 2:
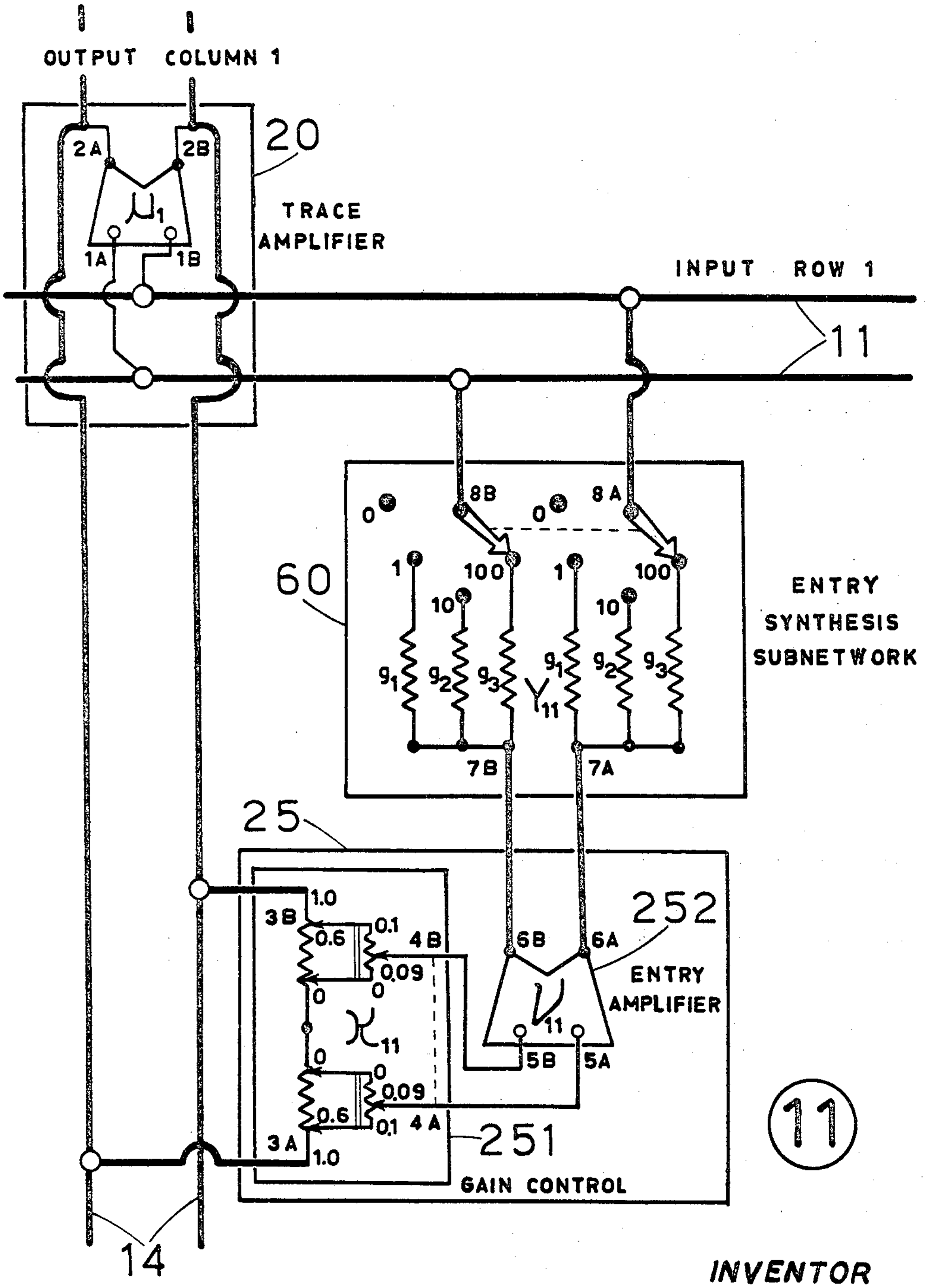
FIG. 2 shows in detail the entry device indicated in FIG. 1.

To emphasize the homeomorphism between the mathematics and the machine, the control panel of the synthesizer can be arranged with rows and columns of multideck thumbwheel switches in the image of a matrix, with digitized dial settings expressed as a 0.00 to 1.00 factor times 10 raised to a desired power as illustrated in FIG. 1. For example, a mathematical coefficient such as $a_{11}=69$ may thus be dialed as $0.69 \times 100$, as illustrated in the ⑪ entry of FIG. 1. Referring to FIG. 2, the precision gain control 251 is a digitized multiplier with settings from $\kappa_{11}=0.00$ to $\kappa_{11}=1.00$. The powers of 10 are the $y_{11}$ admittances and may be pairs of fixed conductances switched in decade units for constant mathematical terms.

For example $a_{11}=69=0.69 \times 100$ the digitized gain control 251 is dialed as $\kappa_{11}=(0.60+0.09)=0.69$ as shown in FIG. 2. The numerical precision can naturally be increased beyond the two significant digits illustrated in FIG. 1 and FIG. 2 by a more precise gain control 251.

The powers of 10 multipliers $\times 1$, $\times 10$, and $\times 100$ are provided by the pairs of conductances $g_1$—$g_1$, $g_2$—$g_2$, and $g_3$—$g_3$. The multiplying factor $\times 100$ in the example is the pair of conductances $g_3$—$g_3$ dialed in the entry synthesis subnetwork 60 in FIG. 2. These have the value $1_{y11}=100$ (units of the design-base admittance in mhos). Additional multiplying factors can similarly be introduced.

Time-derivative or $d/dt$ mathematical entries are represented by employing pairs of capacitances $C_1$—$C_1$, $C_2$—$C_2$, and $C_3$—$C_3$ for the synthesis subnetworks as indicated in 60A of FIG. 3. Similarly, time-integral terms are synthesized by employing pairs of inductances $L_1$—$L_1$, $L_2$—$L_2$, and $L_3$—$L_3$, as shown by 60B of FIG. 3. The pairs of capacitances and inductances are of course appropriately scaled in numerical magnitudes to provide the desired multiplying factors.

Generalized lattices, such as 601, 602, and 603, etc., in FIG. 3 (60C), where 604, 605, 606, 607, 608, and 609 are suitable electrical components may be employed in place of the pairs of conductances in 60, capacitances in 60A and inductances in 60B as entry synthesis subnetworks. Such generalized lattices 60C, FIG. 3, provide great flexibility and latitude in the design of the electronic synthesizer and are furthermore the means for synthesizing networks to represent very complex mathematical entries.

A matric problem is entered into such an electronic synthesizer by dialing the desired terms as specified by the mathematical problem. For each $a_{ij}$ entry in the coefficient matrix [A], and $b_i$ of the prescribed column vector $[b]$ of Equation 1, there is a correspondingly arranged switch in the machine. Setting each digitized switch to the appropriate indication for a given mathematical problem completes the setting of the machine.

Differential equation systems are as easily solved, or simulated for control or other purposes, as systems of matric algebraic equations by the electronic synthesis network. A system with only first-order differential coefficients is entered into the synthesis network just as a matric algebraic system. If the differential equation system contains differential coefficients of order higher than the first, then it is first of all rewritten as an equivalent first-order matric system. This is done by well known matric-mathematic techniques as discusssed in the specification of Patent 3,038,660. Finally, the automatically generated solution vector $[v]$ corresponding to [x] in Equation 1, usually comprising constants in the case of algebraic systems, is read out on a digital voltmeter 93. In the case of differential equation systems, plotting recorders 95, FIG. 1, may be utilized.

Two additional points are pertinent to matric differential equation systems: initial conditions, and non-linear problems. The initial conditions of a differential equation system at $t=0$ are respresented by the response vector $[v_o]=[v_{ic}(0)]$. This initial condition vector $[v_{ic}(0)]$ is entered into the computing or synthesis network by switching in the voltage sources $u_1, u_2, \ldots, u_n$ or 110, 111, . . ., 112, see FIG. 1, which are adjusted until the proper values are reached. It may be noted that during this operation the prescribed current sources are ineffective although also connected to the input-rows. Upon release of the initial condition switches associated with the voltage sources, see FIG. 1, the prescribed current sources $j_1, j_2, \ldots, j_n$ or 101, 102, . . ., 103 representing the $[b]$-vector in Equation 1 take over the forcing of the network response.

The machine solution of variable-coefficient and non-linear differential equation systems is of the utmost importance, particularly in technology. The theory of the present invention indicates that this type of problem is also accessible to the electronic network synthesizer.

As an example of the theoretical considerations involved, the following matric system of non-linear differential equations may typically be considered, $$\{A_n(x, t)\cdot D^n x + A_{n-1}(x, t)\cdot D^{n-1}x + \ldots + A_0(x, t)\cdot x\} = F(t) \quad (4)$$

in which the $[A_i(x, t)]$ are $m$th order matrices of functions of the dependent-variable vector $[x]$ and the independent variable $t$; $D^n=[1]\cdot(d^n/dt^n)$, where $[1]$ is the $m$th order identity matrix; and $F(t)$ is a column matrix of $m$th order with prescribed real functions of $t$ as elements. Placing for convenience $$[X]=\text{col}\,(D^n x, D^{n-1}x, \ldots, Dx, x)$$

a first-order matric system equivalent to Equation 4 reads $$\begin{bmatrix} [A_n(x,t)] & [A_{n-1}(x,t)] & \cdot & [A_1(x,t)] & [A_0(x,t)] \\ [-1] & [D] & \cdot & [0] & [0] \\ [0] & [-1] & \cdot & [0] & [0] \\ \cdot & \cdot & \cdot & \cdot & \cdot \\ [0] & [0] & \cdot & [D] & [0] \\ [0] & [0] & \cdot & [-1] & [D] \end{bmatrix} \cdot [X] = \begin{bmatrix} [F(t)] \\ [0] \\ [0] \\ \cdot \\ [0] \\ [0] \end{bmatrix} \quad (5)$$

To solve Equation 5, and thus Equation 4, by the electronic synthesis network, all that is required is a number of synthesis subnetworks, one for each non-linear or variable matric entry. Each must have as its appropriate $y_{ij}$ admittance coefficient the functional relationship demanded by the mathematics, for example a term such as $[A_n(x, t)]$ in Equation 5. As shown in FIG.4 symbolically, three possibilities exist for the construction of these variable coefficients.

First of all, as shown in FIG. 4, the precision gain control 375 may be servo or electronically controlled by the electric variables corresponding to the dependent or independent variables in the particular mathematical coefficient ${}^2a_{ij}(x, t)$. Secondly, the actual element values in the entry synthesis subnetwork $[y_{ij}]$ or 726 may have component values which are either servo or electronically controlled depending upon the desired mathematical functional relationship ${}^1a_{ij}(x, t)$. In some instances these subnetworks may contain inherently non-linear devices such as quasi-linear diodes, thyrite dinodes of appropriate non-linear characteristics, solid-state devices, and so forth. Finally, the entry amplifier 376 in FIG. 4 may itself be of the variable-gain type in which a control voltage bias (which varies the gain $v_{ij}$ of the entry amplifier) relates functionally to the desired electric coordinate in the network, yielding the desired mathematical relationship ${}^3a_{ij}(x, t)$ represented by the particular matric entry.

The arrangement shown in FIG. 4 makes possible the synthesis of the most complicated mathematical entry as indicated above. Thus the solution of variable-coefficient and non-linear mathematical matric systems by the electronic synthesis network is practicable and flexible.

FIG. 5 is introduced primarily to show that the principles of the electronic synthesis network are also applicable to a more rudimentary system comprising unipolar input and bipolar output trace amplifiers 120, 121, and 122, but otherwise similar to the network shown in FIG. 1. This reduces the number of components required foı the $y_{ij}$ entry synthesis subnetworks. The mathematics and the system perform substantially alike whether following the pattern indicated in FIG. 5, or the system indicated in FIG. 1 to FIG. 4. Of course, the networks in FIG. 1 to FIG. 4 enjoy the well-known inherent advantages of balanced-to-ground configuration which simplifies the burden on the power sources of the amplifying devices, particularly in the non-linear situation, and furthermore yields improved linearity as well as other desirable effects delineated below.

The present invention introduces a multiplicity of entry isolating amplifiers $v_{ij}$ in cascade with entry synthesis subnetworks $y_{ij}$ for each mathematical matric entry, as described in conjunction with the figures. This permits simplification of the entry synthesis subnetworks representing mathematical coefficients which vary from problem to problem, because the entry synthesis subnetworks may thereby be fixed in magnitude and stepwise adjustable in powers of ten, with the fractional parts thereof entered by means of a precision gain control.

Additionally, the operation of the $\mu_i$ or trace amplifiers is likewise much improved, for each of the latter now functions into the constant admittance load of the gain controls $\kappa_{ij}$ on one column only, and this loading is unchanged no matter what the mathematical problem. The trace amplifiers $\mu_i$ can therefore be designed to function at the highest linearity and efficiency. On the other hand, the variable loading due to the synthesis subnetworks $y_{ij}$ which is a function of the particular problem being simulated or solved is taken up by the entry amplifiers. Each entry amplifier $\nu_{ij}$ is designed to operate under optimum conditions for the maximum loading which can ever be placed upon it, namely that pertaining to the largest coefficient which can be dialed. Thus the loading on the entry amplifiers $\nu_{ij}$ is likewise predictable and can be considered in their design. This results from the fact that the electronic synthesis network has a fixed configuration, no matter what problem is being solved or simulated.

The introduction of the unilateral $\nu_{ij}$ entry amplifiers also markedly improves the dynamic stability of the entire electronic network, because the unilateral and isolating property of these amplifiers effectively eliminates residual coupling terms which otherwise are present. This is a very important point which cannot be understood unless an actual machine is employed or the complete mathematics of the network carefully investigated.

Finally, the introduction of balanced amplifiers throughout improves the linearity of response and thus the accuracy of the mathematical solution. The linearity is enhanced by the suppression of the principal harmonic content in the output of the trace and entry amplifiers, particularly important for dynamically varying problems such as differential equations, linear and non-linear, as well as algebraic systems.

There is increased versatility in the present invention for functionally varying or non-linear problems because, as shown in FIG. 4, it is possible to employ three separate means of functionally varying each of the entry subnetworks to match the varying mathematical character of the problem. This versatility is extremely useful and important in these more complex situations, and the increased fidelity of the balanced-to-ground scheme improves the accuracy of solutions to such non-linear problems.

Lastly, change of mathematical equation signs from plus to minus is extremely simple, requiring only the interchanging or switching of entry synthesis subnetwork connections.

Various facets of one form of the device of this invention are set forth in the following publication:

Pierre M. Honnell, "The Matric Computor," The Bridge, vol. 59, No. 2, pp. 2–9, winter 1962 issue, Eta Kappa Nu Association, Urbana, Ill.

What is claimed is:

1. Apparatus for simulating and solving mathematical matric equations having an ordered array of rows and columns of entries including a column of unknown dependent variables to be determined and a column of known prescribed functions, comprising a number of high-gain amplifiers each having two input and two output terminals, a multiplicity of pairs of identical two-terminal electric network components each pair adapted to represent an entry in a mathmetical matrix with the values and type of the components corresponding to the numerical magnitude and mathematical type of the matric entry, a multiplicity of isolating amplifiers having two input and two output terminals each being associated with one of the pairs of identical two-terminal electric network components, the first pair of identical two-terminal electric network components having one terminal of one component connected to one of the inputs of the first high-gain amplifier and one terminal of the other component of this pair connected to the other input terminal of the first high-gain amplifier, this pair being adapted to represent the first entry in the first row and column of the mathematical matrix, other pairs of identical two-terminal electric network components connected similarly with each pair adapted to represent one of the remaining entries in the first row of the mathematical matrix, other pairs of identical two-terminal electric network components connected in like manner to the input of the second high-gain amplifier and adapted to represent respectively the entries in the second row of the mathematical matrix, and so on with other pairs of identical two-terminal electric network components, the pairs connected to the input of the last high-gain amplifier being adapted to represent the entries in the last row of the mathematical matrix, the first pair of identical two-terminal electric network components having their other terminals connected to the output terminals of their associated isolating amplifier which in turn has its input terminals connected to the output terminals of the first high-gain amplifier, other of the pairs of identical two-terminal electric network components having their other terminals connected to their associated isolating amplifiers whose inputs are similarly connected to the output terminals of the first high-gain amplifier and adapted respectively to represent the remaining entries in the first column of the mathematical matrix, other of the pairs of identical two-terminal electric network components having their other terminals connected to the output terminals of their associated isolating amplifiers which in turn have their input terminals connected to the output terminals of the second-gain amplifier and these pairs adapted respectively to represent entries in the second column of the mathematical matrix, and so on with the other pairs of identical two-terminal electric network components and associated isolating amplifiers, the last pair of network components being adapted to represent the last entry in the last column of the mathematical matrix, a number of current sources, the first current source being connected to the input of the first high-gain amplifier, the second current source being connected to the input of the second high-gain amplifier, and so on, the last current source being connected to the input of the last high-gain amplifier, each current source output being adapted to correspond in magnitude and type to its respective entry in the column of prescribed functions in the matric equation, a plurality of translating devices connected to the outputs of the high-gain amplifiers adapted to respond to the solution of the matric equation.

2. The apparatus of claim 1 wherein the isolating amplifers are provided with gain controls, the values and type of the pairs of identical two-terminal electric network components together with the setting of the gain control on the isolating amplifier associated therewith being adapted to represent the numerical magnitude and mathematical type of the matric entry represented.

3. The apparatus of claim 1 wherein a readout amplifier is provided for each high-gain amplifier said readout amplifier being interposed between the output of the high-gain amplifier and the translating devices.

4. The apparatus of claim 1 and a number of voltage sources arranged for momentary connection to the high-gain amplifier inputs and adapted to energize the network components representing differential and integral entries to the extent determined by the initial conditions imposed by the mathematical problem.

5. The apparatus of claim 1 wherein the isolating amplifiers have variable-gain characteristics adapted to be varied in accordance with mathematical functions.

6. The apparatus of claim 1 wherein the pairs of identical two-terminal electric network components are variable and means to vary the value of said pairs, and adapted to vary the value in accordance with mathematical functions.

7. Apparatus for simulating and solving mathematical matric equations having an ordered array of rows and columns of entries each consisting of one or more terms, including a column of unknown dependent variables to be determined and a column of known prescribed functions, comprising a number of high-gain amplifiers each having two input and two output terminals, a multiplicity of lattice networks with a pair of input and a pair of output terminals, and a multiplicity of isolating amplifiers having two input and two output terminals, each of the lattice networks associated with one isolating amplifier and adapted to represent a term in an entry of a mathematical matrix, the first lattice network having its output terminals connected to the input of the first high-gain amplifier and adapted to represent a term in the first entry of the first row and column of the mathematical matrix, other lattice networks connected similarly and adapted to represent respectively the remaining terms of the entries in the first row of the mathematical matrix, other lattice networks being connected in like manner to the input of the second high-gain amplifier and adapted to represent the terms in the entries in the second row of the mathematical matrix, and so on with other lattice networks, the lattice networks connected to the input of the last high-gain amplifier adapted to represent the entries in the last row of the mathematical matrix, the first lattice network having its input terminals connected to the output terminals of its associated isolating amplifier said isolating amplifier having its input terminals connected to the output terminals of the first high-gain amplifier and the value of the lattice network adapted to represent a term in the first entry in the first row and column of the mathematical matrix, other lattice networks having their input terminals similarly connected to the outputs of their associated isolating amplifier said isolating amplifiers having their inputs connected to the output terminals of the first high-gain amplifier and the values of these lattice networks adapted to represent respectively the remaining terms in the entries in the first column of the mathematical matrix, other of the lattice networks having their input terminals connected to the output terminals of their associated isolating amplifier, said isolating amplifiers having their input terminals connected to the output terminals of the second high-gain amplifier with these lattice networks adapted to represent respectively the terms in the entries in the second column of the mathematical matrix, and so on with other lattice networks and associated isolating amplifiers adapted to represent respectively the terms in the entries in the remaining columns of the mathematical matrix, the last lattice network having its input terminals connected to the output terminals of its associated isolating amplifier which in turn has its input terminals connected to the output of the last high-gain amplifier this last lattice network adapted to represent the last term in the last entry in the last column of the mathematical matrix, a number of current sources each current source being connected to the input of one of the high-gain amplifiers, each current source output being adapted to correspond in numerical magnitude and type to an entry in the column of prescribed functions in the matric equation, a plurality of translating devices connected to the outputs of the high-gain amplifiers adapted to respond to the solution of the matric equation.

8. The apparatus of claim 7 wherein each of the isolating amplifiers is provided with means for varying its gain.

9. The apparatus of claim 7 and a number of voltage sources arranged for momentary connection to the high-gain amplifier inputs.

10. The apparatus of claim 7 wherein the lattice networks are variable in value and adapted to vary in value in accordance with mathematical functions.

11. Apparatus for simulating and solving mathemetical matric equations having an ordered array of rows and columns of entries including a column of unknown dependent variables to be determined and a column of known prescribed functions, comprising a number of high-gain amplifiers each having one input, one common and two output terminals, a multiplicity of pairs of two-terminal electric network components each pair together adapted to represent an entry in a mathematical matrix, a multiplicity of isolating amplifiers having two input and two output terminals each being associated with one of the pairs of two-terminal network components, the first pair of two-terminal network components having one terminal of each component connected to the input terminal of the first high-gain amplifier, this pair being adapted to represent the first entry in the first row and column of the mathematical matrix, other pairs of two-terminal network components connected similarly with each pair adapted to represent one of the remaining entries in the first row of the mathematical matrix, other pairs of two terminal network components being connected in like manner to the input of the second high-gain amplifier and adapted to represent respectively the entries in the second row of the mathematical matrix, and so on with other pairs of two-terminal network components, the pairs connected to the input of the last high-gain amplifier being adapted to represent the entries in the last row of the mathematical matrix, the first pair of two-terminal network components having their other terminals connected to the output terminals of their associated isolating amplifier which in turn has its input terminals connected to the output terminals of the first high-gain amplifier, other of the pairs of two-terminal network components having their other terminals connected to their associated isolating amplifiers whose inputs are similarly connected to the output terminals of the first high-gain amplifier, these pairs of network components adapted to represent respectively the remaining entries in the first column of the mathematical matrix, other of the pairs of two-terminal network components having their other terminals connected to the output terminals of their associated isolating amplifiers which in turn have their input terminals connected to the output terminals of the second high-gain amplifier and these pairs of network components adapted to represent respectively entries in the second column of the mathematical matrix, and so on with other pairs of two-terminal network components and associated isolating amplifiers, the last pair of network components having its other pair of terminals similarly connected to the output of its associated isolating amplifier which in turn has its input connected to the output of the last high-gain amplifier, this last pair of network components being adapted to represent the last entry in the last column of the mathematical matrix, a number of current sources each provided with two terminals, the terminals of the first current source being connected to the input and common terminals of the first high-gain amplifier, the terminals of the second current source being connected to the input and common terminals of the second high-gain amplifier, and so on, the terminals of the last current source being connected to the input and common terminals of the last high-gain amplifier, the output of each current source being adapted to correspond in magnitude and type to its respective entry in the column of prescribed mathematical functions in the matric equation, a plurality of translating devices each connected to the output terminals of a high-gain amplifier and adapted to respond to the solution of the mathematical matric equation.

12. The apparatus of claim 11 wherein each of the isolating amplifiers is provided with means for varying its gain.

13. The apparatus of claim 11 and a number of voltage sources arranged for momentary connection to the input and common terminals of the high-gain amplifiers.

14. The apparatus of claim 11 wherein the pairs of two-terminal electric network components are variable in value and adapted to vary in value in accordance with mathematical functions.

References Cited

UNITED STATES PATENTS 2,836,731 5/1958 Miller ------------- 235—185

MALCOLM A. MORRISON, *Primary Examiner.*

K. W. DOBYNS, J. RUGGIERO, *Assistant Examiners.*